Patented Sept. 26, 1933

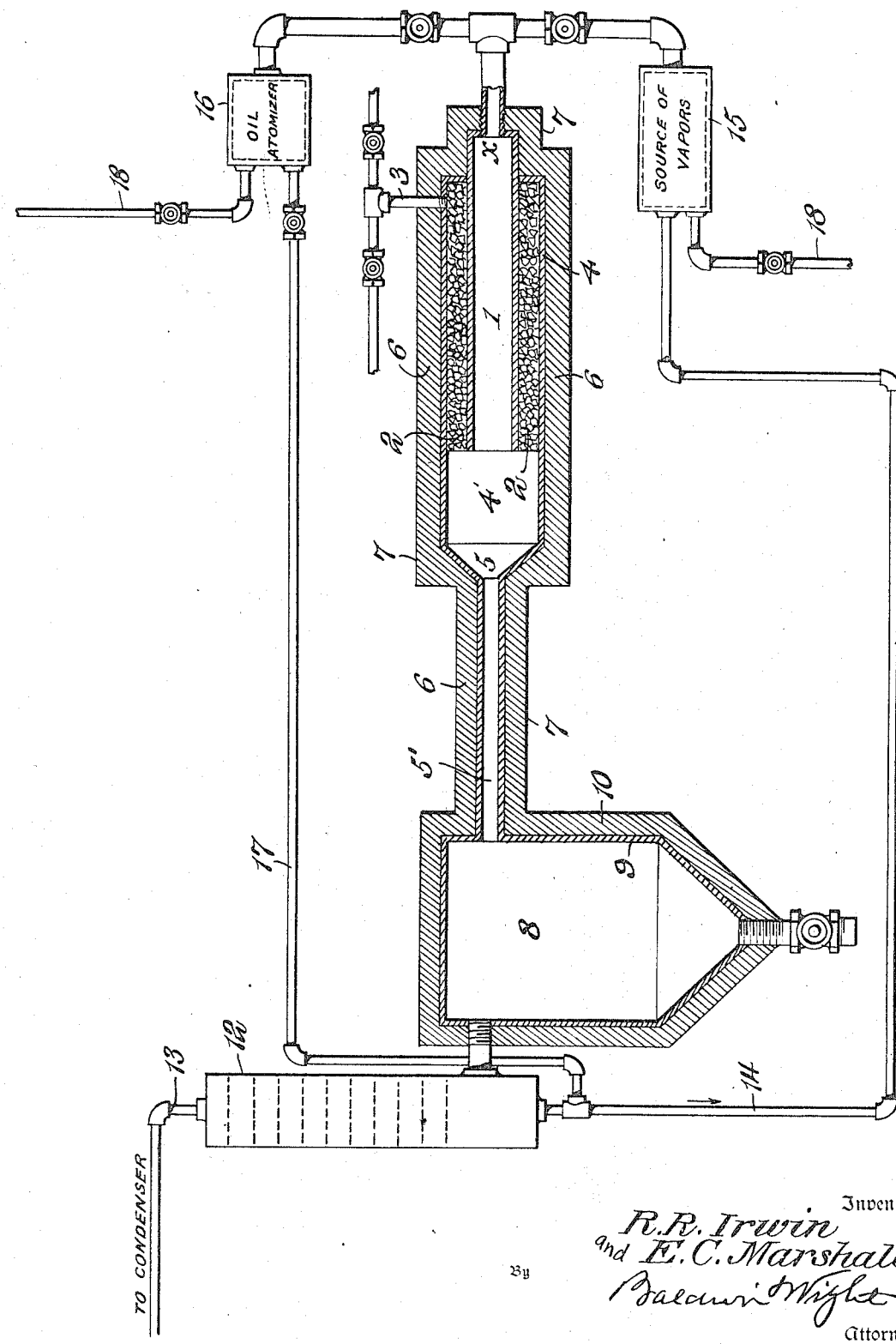

1,928,494

UNITED STATES PATENT OFFICE 1,928,494

APPARATUS FOR THE CONVERSION OF HYDROCARBON OILS

Ray R. Irwin and Emery C. Marshall, Kansas City, Mo., assignors, by mesne assignments, to Socony-Vacuum Corporation, New York, N. Y., a corporation of New York Application May 3, 1928. Serial No. 274,823

3 Claims. (Cl. 196—104)

This invention relates to a process and apparatus for the conversion of hydrocarbons of high boiling point to hydrocarbons of lower boiling point by the vapor phase method of cracking.

The object of the present invention is to provide a simple and easily operated process and an inexpensive apparatus for the separation or conversion of hydrocarbons to any of the desired products contained therein or capable of being formed therefrom.

The invention, broadly, consists in subjecting hydrocarbon vapors or atomized hydrocarbons to a cracking temperature while traveling through a highly heated elongated cylinder, allowing said cracked hydrocarbons to mix with the products of combustion utilized in heating the cylinder, suddenly contracting the cracked vapors, subsequently permitting them to expand and retaining them for a period of time sufficient to establish equilibrium of the vapors, after which they are fractionated, the desired low boiling point hydrocarbons condensed, and the uncracked portions re-run through the apparatus or carried to a storage tank.

The accompanying drawing illustrates a suitable apparatus for carrying out this invention.

Numeral 1 denotes an elongated cylinder or sleeve made from silicon carbide, alundum or similar heat conductive refractory material. Around this cylinder 1, for the greater part of its length, is packed granular material 2, having properties similar to that of the cylinder. This granular material 2 and cylinder 1 are contained within a second heat conductive refractory cylinder 4 and the whole contained within a heavy heat insulating sleeve 6, which is encased by a metallic jacket 7. A gaseous fuel pipe 3 leading from a source of gas and air is connected to cylinder 4 for the purpose of supplying heat to the cylinder 1. This gaseous mixture is burned in the interstices of the granular material 2 and supplies a degree of heat to cylinder 1 sufficient to crack hydrocarbons.

Oil vapors are fed to the cylinder 1 from the vapor source 15, which obtains its supply of oil from a previous run of the process, or oil may be sprayed into the cylinder 1 by an atomizer. Steam may be mixed with the vapor or spray if desirable. The atomized oil or oil vapors are thus subjected to a cracking temperature while passing through the heated cylinder 1, which heats the incoming oil by radiation. It will be understood that references in the claims to vaporizing the oil include either vaporizing of the oil by application of heat or atomizing the oil into finely divided condition in accordance with the disclosure herein. After being heated to a temperature high enough to insure cracking, the cracked oil vapors are mixed with the products of combustion from the burning of the gaseous fuel in the material 2, by their entry within the space 4' at the end of cylinder 1 and outer cylinder 4. After this mixing, the oil vapors and combustion products are suddenly passed through contracted passageway 5. Passageway 5 communicates through a long insulated passageway 5' with an enlarged carbon pot or expansion chamber 8 lined with refractory material 9 and externally covered with heat insulating material 10.

The cracked vapors remain in the expansion chamber 8 for a period of time sufficiently long for them to reach an equilibrium. From the expansion chamber the vapors are delivered through pipe 11 to a conventional fractionating tower 12 and condenser (not shown), or they are passed to a similar unit for further treatment. The heavy ends may, however, be passed back to the vapor generator 15 through pipe 14 or to the atomizer 16 through pipe 17. It will be noted that fresh oil may be supplied to either feeding device through pipes 18. Thus, the cracking unit may receive its oil supply from a storage tank or from the uncracked portions of a previous unit, or it may be supplied from the uncracked portions separated within the particular unit itself. This latter method of returning the uncracked portions to a further treatment insures a complete conversion of all of the available products.

It will be seen that suitable valves are provided for handling the flow of oil or vapors for either of these methods of supplying the unit and also the gaseous fuel, air, etc.

We claim:

1. An apparatus for cracking petroleum consisting of a refractory cylinder communicating with a source of petroleum vapors, a granular refractory packing surrounding the cylinder, a heat source maintaining a controlled combustion in said packing, a mixing chamber for said cracked vapors and products of combustion of said heat source, said cylinder preventing admixture of the cracked vapors and products of combustion in advance of the mixing chamber, a passage leading from said mixing chamber to an expansion chamber and a fractionating tower condenser to separate and condense said petroleum vapors.

2. Apparatus for cracking hydrocarbons which comprises an elongated cracking chamber, means for supplying oil to be treated to said chamber, a combustion chamber surrounding said cracking chamber comprising a mass of granular refractory material substantially entirely encasing the cracking chamber, means for supplying combustible material to the combustion chamber and thereby maintaining a combustion in intimate heat transfer relation with substantially the entire exterior of the cracking chamber, and an open chamber at the end of the cracking chamber and combustion chamber for receiving both treated oil from the cracking chamber and gases of combustion from the combustion chamber to thereby effect intimate admixture thereof.

3. Apparatus for cracking hydrocarbons which comprises an elongated cracking chamber, means for passing oil to be treated through said cracking chamber, means for supplying heat for the cracking reaction out of communication with the interior of the cracking chamber including a chamber surrounding said cracking chamber which contains a mass of granular refractory material, a chamber communicating both with the discharge outlet from said combustion chamber and the discharge outlet from the cracking chamber wherein admixture of treated oil and products of combustion is effected, a discharge line of restricted cross-section for conducting the admixture of products from said chamber, an expansion chamber for receiving the products discharged from said restricted line, and means associated with said expansion chamber for effecting separation between sufficiently and insufficiently cracked hydrocarbons.

RAY R. IRWIN.
EMERY C. MARSHALL.